INVENTORS
RICHARD M. COPENHAVER
GILBERT D. BEINHOCKER
BY
ATTORNEYS

United States Patent Office 3,172,404
Patented Mar. 9, 1965

3,172,404
VISUAL TESTING APPARATUS
Richard M. Copenhaver, New York, N.Y., and Gilbert D. Beinhocker, Cambridge, Mass., assignors, by mesne assignments, to Technical Measurement Corporation, North Haven, Conn., a corporation of Delaware
Filed Apr. 3, 1962, Ser. No. 184,747
9 Claims. (Cl. 128—2.1)

This invention relates in general to visual testing and more particularly to a system for objective determination of the limits and continuity of the peripheral and central visual field.

The quality, character, and limits of the peripheral and central visual field are important in the determination of the visual capability of a subject, particularly in the case of certain occupations such as aircraft pilots, vehicle drivers, and the like where considerations of safety require a nearly normal visual field. Even more importantly, alterations in the visual field provide specific diagnostic information on ocular and intracranial diseases. For example, a disease such as glaucoma can often be detected, by observance of diminishing peripheral vision at a sufficiently early stage to institute treatment. In addition, the location of blind areas and changes in the shape of the visual field, due to limitations in vision, can provide significant diagnostic evidence relating to the size, location, and stability of a lesion in the visual pathway.

Visual field testing is one of the most important diagnostic techniques available for the specific determination of the nature of various neurological disorders. Representative of these disorders are tumors, arterial occlusion, etc. The physiological basis for relating the quality of visual fields to neurological disorders lies in the structure of the optic nerve which runs as a main trunk from the retina of the eye to about a third back into the brain. There it fans out in myriads of neural nests, passing completely through the brain, terminating in the occipital lobes. Because there are vast numbers of these optical nerve fibers permeating the brain, any brain damage caused by tumors, occlusions, etc., will in all probability disrupt the normal operation of the visual nerve pathways. Since the optic nerve also terminates in the eye by meshing into the cones and rods of the retina, any damage to the aforementioned visual pathways in the brain will have a pronounced and specific effect on the total visual field of the person afflicted with such a disorder. The nature of the brain disorder shows up as a loss of vision in a certain sector of the total visual field.

Various methods are employed for determination of the visual field. Perhaps the most common method is one in which the patient is seated one meter distant from a black felt screen with his head held in a brace to hold it rigid. The patient is requested to maintain his gaze on a fixation object at the center of the screen and is instructed to respond by a prearranged signal immediately upon seeing a target which is moved into the periphery of his field of vision. Several mechanical devices, referred to as perimeters, have been employed to facilitate this type of testing. The usual mechanical perimeter utilizes a hemispherical shell with the patient in a position where his eye occupies the center of the hemisphere. In some devices, the examiner presents the target as a luminous spot on a wand while in others a projected light serves as the target. An examiner conducting the test usually records the results on a separate chart while the examination is in progress.

The above-described methods have a serious disadvantage in that they are subjective, both from the viewpoint of the patient and of the examiner. Thus, the tests cannot be administered to young children, seriously ill, anesthetized, or comatose patients where the information would often be of the most immediate significance, as for example in locating the site of an intracranial hemorrhage. In addition, the results of the test are subject to error due to factors such as the patient's lack of concentration, inaccuracy of response, fatigue, language barriers, nervousness, and psychiatric disorders. Also since the test is very time consuming, the test is not repeated several times in order to achieve a good statistical sampling of the patient's response. Hence spurious responses such as momentary non-fixation will go undetected. Subjective factors on the part of the examiner include the observation of the examiner regarding the patient's fixation on the fixation object, his explanation of the instructions to the patient, and his observation of the patient's responses. In addition, interpretations of results are generally made by the clinician rather than the examiner, and hence the validity of the results is dependent on a knowledge of the examiner's reliability.

It is, therefore, a primary object of the present invention to provide apparatus for objectively, rapidly and automatically determining the limits, continuity and quality of the peripheral and central visual field in humans.

It is another object of the present invention to provide an apparatus for objectively determining and automatically recording the quality and extent of the peripheral and central visual field in humans.

It is still another object of the present invention to provide an apparatus for objectively testing the visual field in humans and automatically recording a testing result in the form of both a visual display and a permanent record.

Broadly speaking, the apparatus of the present invention determines a subject's visual field by measuring the variations in occipital potential evoked by presenting an illuminated spot in various positions angularly displaced from the subject's axis of focus.

It has been determined that when light discharges a portion of the retina of a human eye, it normally evokes a potential in that portion of the occipital region, corresponding to the region of the retina discharged. A discharge in the temporal region of the retina of the left eye evokes a response in the left occipital lobe, and a discharge in the nasal region of the same retina evokes a response in the right occipital lobe. Similarly, with the right eye, discharge in the temporal region evokes a response in the right occipital lobe, while one in the nasal region evokes a response in the left occipital lobe.

Such response is independent of the patient's volition, hence the test is independent of such factors as cooperativeness, fatigue, consciousness, etc.

In a typical form, the apparatus may include a hemispherical target with twenty or thirty neon lights distributed over its surface. The pole of the hemisphere is provided with an opening into which is fitted a magnifying eye piece with cross hairs. The subject is positioned so that his eye is located at the center of the hemisphere facing the concave side. During the test, the patient is instructed to focus on the hole in the hemisphere and the examiner, located on the opposite side of the hemisphere, may sight through the magnifying eye piece with cross hairs and thus verify the patient's fixation. An electroencephalograph is connected to the head of the patient with the ground electrode located at the front of the patient's head and the signal electrode attached to his occipital lobe.

To perform the test, the neon lamps are sequentially flashed on and off in accordance with a preselected pattern which has been programmed into the electronic control circuitry. The output signals from the electroencephalograph are correlated with signals from the control circuitry to provide an output indicative of occipital response as a function of the position of illumination on the target. This output may be automatically presented either on a pen recorder or on a visual display, such as a duplicate of the target hemisphere, with light illuminated only in those positions where the subject did not "see."

Other objects and advantages will become apparent from the following detailed description when taken in conjunction with the accompanying drawing in which.

Figure 3:
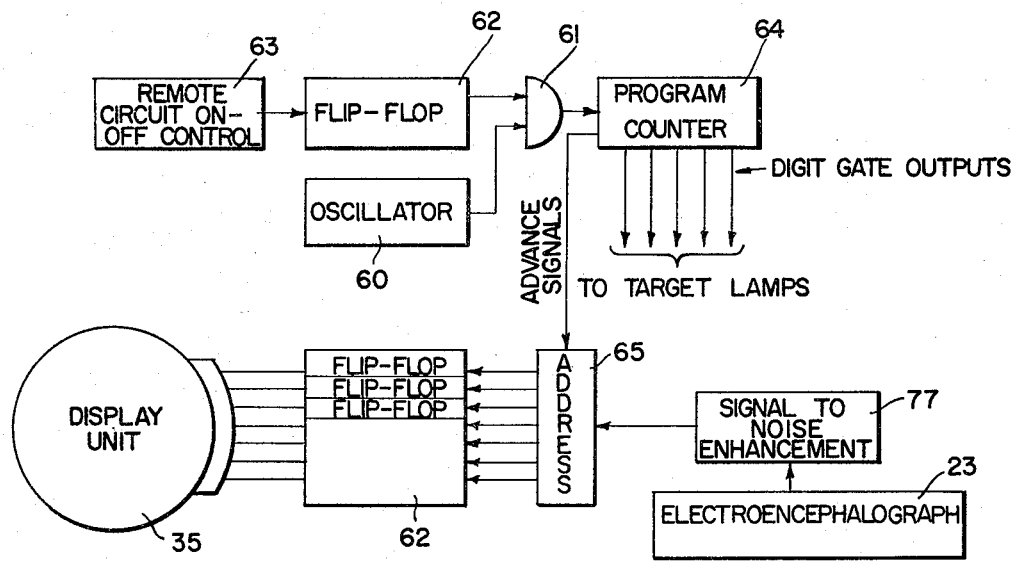
Figure 4:
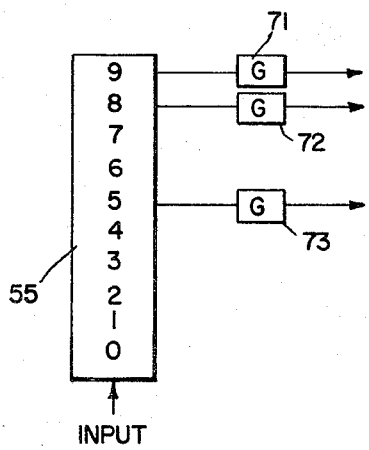
Figure 5:
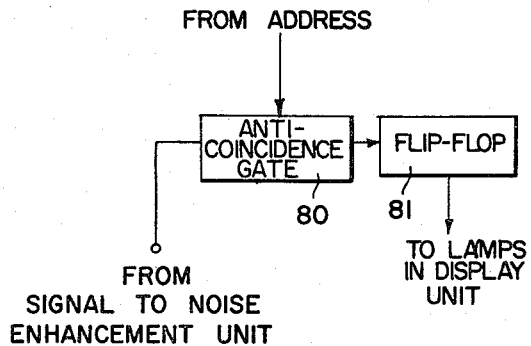

FIG. 3 is an illustration in block diagrammatic form of a circuit useful in the practice of this invention; and FIG. 4 is an illustration in block diagrammatic form of a specific circuit arrangement suitable for use as the program counter shown in FIG. 3; and FIG. 5 is an illustration in block diagrammatic form of a specific circuit arrangement suitable for use as a portion of the address unit of FIG. 3.

Figure 1:
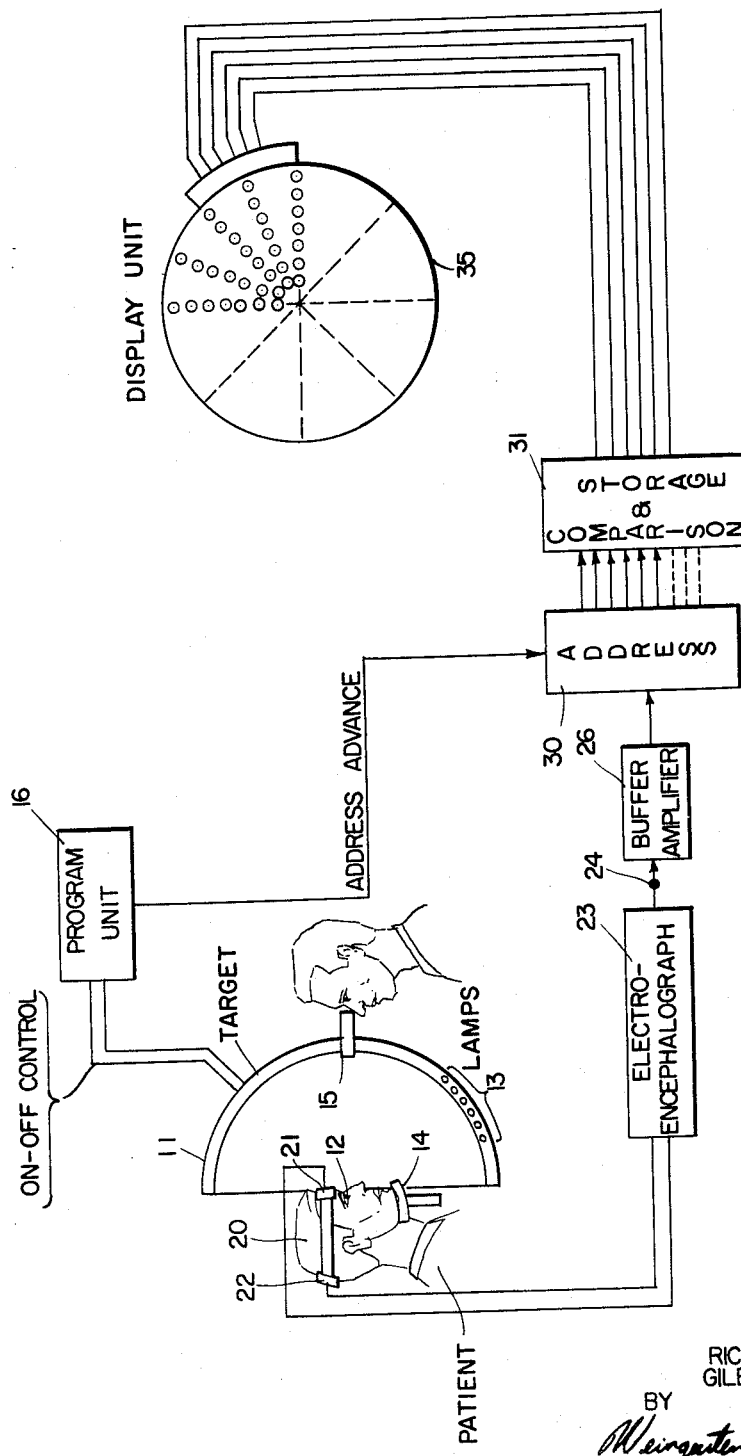
FIG. 1 is an illustration in diagrammatic form of a testing apparatus in accordance with the principles of this invention.

With reference now specifically to FIG. 1, the target 11 is shown as a hemisphere with one eye 12 of the subject 20 positioned at the center of the hemisphere. A plurality of lamps 13, which typically might consist of neon bulbs, are distributed in a prearranged pattern over the surface of the hemisphere. The lamps are arranged such that, when illuminated, they produce a small spot of light on the interior concave surface of the hemisphere 11. A small hole 15 passes through the hemisphere at its pole. Each of the lamps 13 may be selectively illuminated in accordance with the control signals from a program unit 16. Attached to the head of the subject 20 are a pair of electroencephalograph electrodes, with the ground electrode 21 being located on the patient's forehead and the signal electrode 22 being placed in the occipital region. The electrodes 21 and 22 are connected in conventional fashion to an electroencephalograph 23 which provides as an output, amplified signals representing brain waves measured in the occipital region.

While a conventional electroencephalograph unit is represented in FIG. 1, any sensor device which will provide output signals corresponding to occipital potential variations evoked by the patient "seeing" an appropriate light source, may be used. The light source, however, must have an intensity low enough to stimulate only focal retinal response. With too intense a light source, scattering of light within the eye may induce a total retinal discharge, which does not provide the directionality required for determining field of vision. This directionality arises from the fact that light should be incident only upon a small localized area of the retina at any given time in order that response of each area of the retina can be separately determined thereby providing a separate determination of a corresponding discrete area in the patient's visual field. The output 24 of the electroencephalograph 23 is coupled through a buffer amplifier 26 to one input of address unit 30. The buffer amplifier not only serves to couple the electroencephalograph to the address unit, but in many instances is required to "raise" the evoked occipital response out of the general brain wave noise. This may be accomplished by an amplifier particularly suited to the frequency characteristic of the evoked signal or by any other of the several conventional techniques for improving signal to noise ratio, such as a statistical sampling. As above mentioned, the amount of illumination used to evoke the response must be quite small since focal retinal stimulation is desired and any substantial light scattering within the eye will discharge the whole retina. The use of signal to noise improvement techniques in conjunction with the conventional electroencephalograph permits the intensity of illumination to be decreased and therefore provides directly for more accurate testing.

The address unit 30 is a conventional address unit serving to connect the signals from buffer amplifier 26 to output lines selected in accordance with address advance signals received from the program unit 16. The number of output address lines corresponds to the number of lamps 13 on the target 11, and each address line represents a separate lamp. The address lines are coupled to a comparison and storage unit 31. The comparison and storage unit 31, which will be explained in more detail below, contains a number of sub-units such that for each incoming address line there is an individual sub-unit. Each of the sub-units in comparison and storage element 31 are individually connected to a lamp on display unit 35. The display unit 35 may be a second hemisphere, having lamps distributed over its surface in a pattern which duplicates the distribution of lamps 13 on target 11.

Having described the interconnection of the components of this apparatus, its operation will now be discussed. The subject 20, with his head braced on chin brace 14, focuses one eye on the hole 15 at the pole of the target. When a fixation at this focus has been achieved, the examiner initiates the testing cycle in the program unit 16 by means of an on-off switch. The program unit 16 provides a series of outputs in a preprogrammed sequence, with the output signals serving to flash each individual lamp in a predetermined sequence. The program unit 16 may take any of several conventional forms to provide a predetermined pattern of output pulses. Typically, the program unit might be constructed from an oscillator coupled into solid state counters and gate circuits to provide a digital timer with output leads which carry the signal only at predetermined times. The time pattern of flashing each individual lamp may be one of flashing the lamp at a predetermined rate, such as flashing one lamp every 3 to 4 seconds, with the lamp selected being based on a random selection in terms of location on the hemisphere 11. Alternatively, a specific geometric pattern may be preferred, such as starting at the periphery and sequentially flashing lamps on smaller and smaller radii toward the center. For each illumination, the lamp may be flushed once or it may be flashed at a flicker rate just within the time resolution rate of the human eye, typically 25 to 30 cycles per second, for a short period, such as three seconds.

Each time a light is illuminated, if the patient "sees" the light, a change in occipital potential occurs and is provided an output pulse from the electroencephalograph 23. Between the time when the light from the lamp impinges on the retina of the eye and the time when the occipital potential is evoked, there exists a delay which typically has a duration of about 140 milliseconds. This constant delay time is offset by a delay element in the programmer, for purposes of addressing the output signal from the electroencephalograph 23. This delay element may be in the form of a gated flip-flop circuit.

The output signals from the electroencephalograph 23 are provided to one input of an address system 30. The address system 30 may be any conventional address system, such as a stepping switch or a series of diode gates. Each time the program unit 16 provides a control pulse to a selected one of the lamps 13, it provides an address advance pulse to the address unit 30 and hence for each lamp which is illuminated, the address system is advanced to a separate address. The outputs for each one of the addresses are carried on individual lines from the address unit to a comparison and storage unit 31. The storage unit 31 consists of a number of cells, which in one embodiment might be flip-flop units, each one of the cells corresponding to one of the lamps 13 on the target 11. Thus, each time one of the lamps 13 on the target 11 is illuminated, the cell within the comparison storage unit 31 corresponding to it is addressed. If a signal representing an evoked occipital potential is present on the output of the electroencephalograph amplifier 23 when a particular cell in storage unit 31 is addressed, then the cell provides that the lamp on display unit 35 to which it is coupled does not light, while on the other hand if there is no signal from the electroencephalograph amplifier 23, indicating that the subject did not "see" the illuminated lamp on target 11, then the cell provides that the lamp on display unit 35 is illuminated. The address advance is synchronized with the output of the electroencephalograph amplifier 23 such that the delay in transmission between the retina and the occipital lobe is taken into account. This may be accomplished, as previously described, by delaying the address advance pulse from the program unit by a time equivalent to the intracranial delay.

The comparison and storage unit 31 may, as indicated, take any one of several conventional forms. Typically, it may include anticoincidence circuits such that a flip-flop corresponding to a lamp on display unit 35 only changes state when an address advance pulse occurs which is not in coincidence with an electroencephalograph pulse. The display unit 35 then provides, at the completion of a test series, a display in which lamps are illuminated corresponding only to lamps on target 11 which are not "seen" by the subject. In an alternative arrangement, all lamps in the display unit may be "on" at the beginning of the test and each time the subject "sees" the equivalent target lamp, the display lamp is extinguished.

While the target unit 11 may take any form, in which selected points, angularly displaced from the line of focus of the subject, are illuminated, a hemispherical target has the advantage that the eye of the observer is equidistantly spaced from any point on the surface of the target. The hemispherical shell may be formed of a variety of materials, plastic being a suitable example. The configuration of lights on the surface of the target is shown in FIG. 1 as a series of radial spokes. However, any distinct pattern representing substantially complete coverage of the visual field will suffice. The inner surface of the target is preferably formed of a diffuse, non-reflecting material so that the light from one point on the target is not reflected to another point on the target. One suitable method of accomplishing this is to provide that the inner surface of the hemisphere be coated a dull black. The individual lamps 13 are preferably mounted on the back side of the hemisphere, and their illumination is transmitted either through transparent windows or holes in the inner surface of the target. Suitable lamps for this purpose are small neon glow tubes such as the NE. In the center hole 15 of the target, a magnifying eye piece with cross hairs 40 is mounted to permit the examiner to focus directly on the eye being tested of the subject 20, so that he may observe the fixation of the subject's focus at all times.

Figure 2:
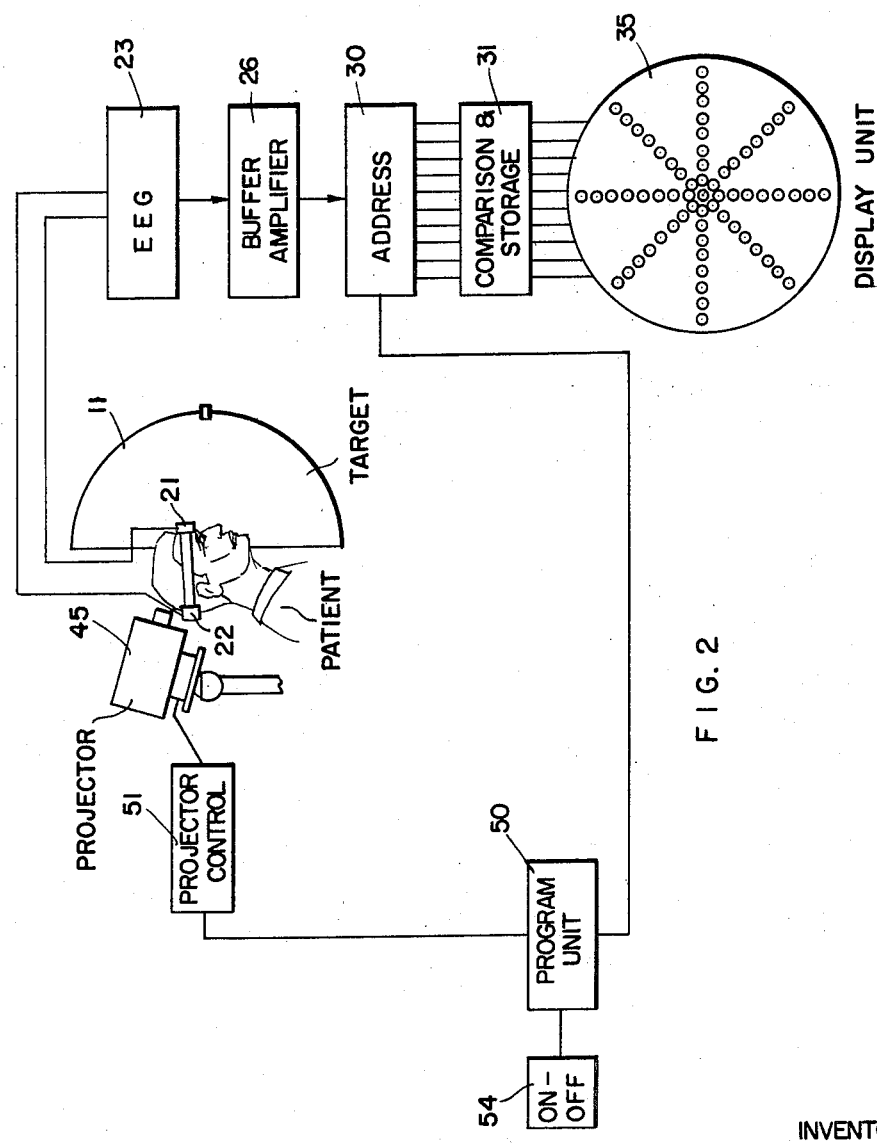
FIG. 2 is an illustration of a second embodiment of an apparatus in accordance with the principles of this invention.

While the apparatus has been described above in terms of lamps mounted on the outer surface of the hemispherical target 11, other methods of illuminating defined spots on the target's inner surface may be employed. Referring to FIG. 2, an apparatus which employs a projector is illustrated. In the apparatus of FIG. 2, a projector 45 is mounted facing the concave side of the target 11. The projector is adapted to provide a small spot of light at a point on the inner surface of the target 11. A program unit 50 provides control signals to a projector control unit 51 which in turn controls the location of the spot projected from projector 45. In this embodiment, then, a sequential pattern of illuminated spots may again be obtained. The program unit 50 also controls an address unit 30 which directs signals received from the electroencephalograph 23 to the comparison and storage unit 31. One advantage of the embodiment including a projected spot is that a "coarse" mapping of the visual field may be made followed by a "fine" mapping of any irregularities which are observed in the evoked responses.

While the program unit operation has been described above in terms of relatively straight-forward correlation of the lamp illumination with the output signals from the electroencephalograph amplifier, it may also be modified to include correction factors. Thus, the programmer can be arranged so that at predetermined points in the testing sequence, it illuminates a lamp on the target 11 corresponding to the natural "blind spot" of the subject. The natural blind spot is, of course, occasioned by the absence of retinal sensitivity at the junction of the optic nerve and the retina and hence while the subject's eye is focused on the center hole of the target, the "blind spot" will remain in a fixed position. If at any time during the test the lamp corresponding to the blind spot evokes an occipital response, this will provide an indication that the subject's focus has shifted and the examiner may then invalidate that portion of the test.

Additional corrective factors may be introduced into the comparison and storage unit 31. For example, if the subject blinks during the course of the examination, an occipital response is evoked which is of far greater amplitude than the response from "seeing" an illuminated spot. By using an overpulse discriminator in the comparison unit 31, the occurrence of the blinking may be registered and any irregularities in the mapping of the visual field occasioned by the blinking may be corrected by repeating that portion of the test.

More specific block diagrams for circuitry suitable for use in the practice of this invention are shown in FIGS. 3, 4, and 5.

In FIG. 3 a circuit arrangement is illustrated employing an oscillator operated program unit. In this arrangement an oscillator 60 has its output connected to one input of an AND gate 61, while the other input of AND gate 61 is suppled from flip-flop unit 62, which is in turn controlled by a remote on-off unit 63. The output of gate 61 is connected to the input of the program counter unit 64, which provides individual digit gate outputs to the individual target lamps and also provides an advance pulse to address unit 65. When the examiner turns on remote on-off control 63, flip-flop unit 62 goes from its "off" state to its "on" state and provides a positive signal at one input of AND gate 61. For each pulse output from the oscillator 60, AND gate 61 then provides an output pulse to the program counter unit 64. The program counter unit 64 would take the form of a series of counters which count the incoming oscillator pulses. Each of the individual digit positions in the program counter may be arranged to provide output gating signals upon being activated. These output pulses are then used to turn on the target lamps and to provide an advance pulse to the address unit 65.

A specific circuit suitable for a program counter is illustrated in FIG. 4. Only one digit column is illustrated for simplicity, but it will be understood that a counter having a total count capacity of $10^6$ or more may be utilized. In the specific counter of FIG. 4, the pulses from the "AND" gate 61 are applied to the input of the counter unit 55. Gates 71, 72, and 73 are shown attached to digit positions 9, 8, and 5, respectively. With this type of programmer, pulse outputs may be provided at any time point after initiation of the testing cycle. Therefore, by arranging the gates at properly selected points, the lamps in target unit 11 may be illuminated in any desired sequence.

With reference again to the system of FIG. 3, a conventional electroencephalograph 23 receives its input in the usual fashion from electrodes placed on the subject's head. The output from the electroencephalograph 23 is coupled to a signal to noise enhancing circuit 77, which is in turn connected to the common input of address unit 65.

The signal to noise enhancing circuit 77 is desirable in order to provide sensitivity to lower levels of illumination, which correspond to pulses lying within the ambient noise level of the electroencephalograph output. The signal to noise enhancing circuit may take any of several conventional forms of improving signal to noise ratio. For example, it may be an analog or digital integrating circuit, in which the integration time is selected to enhance the amplitude of the sought for signal at the expense of the noise.

As previously discussed, the address unit is a circuit which has two inputs, one an advance pulse input and the other the common input from the signal to noise enhancing circuit 71. The function of the address unit is to connect the electroencephalograph output to each of the several addressed output lines in sequence. Thus, when a particular lamp on the target 11 is lit, the program counter provides advance pulses to the address unit such that the electroencephalograph output is coupled directly to a flip-flop memory unit, which is in turn connected to the corresponding lamp on the display unit. In FIG. 5 a specific arrangement for providing an anti-coincidence result is shown. In the circuit arrangement shown each individual flip-flop 81 within the flip-flop unit 62 has associated with it an anti-coincidence gate 80. The address unit 65 actuates in sequence one input of each of the anti-coincidence units 80 and the output from the signal to noise enhancement unit 23 is provided to the other input of all of the anti-coincidence units. Thus, an anticoincidence gate 80 is arranged such that when it is addressed it will provide an output to the associated flip-flop unit 81 only in the event that there is no signal from the signal to noise enhancement unit 23. If, then, the patient sees the light, the anticoincidence gate 80 provides no output and hence flip-flop unit 81 remains in its normal or zero state. In this circuit embodiment a lamp on the visual display unit would only be lit when the flip-flop changed from its zero to its non-zero state.

Specific logical block diagrams have been illustrated as a means of suitably programming and operating an automated analysis of the visual field of the patient being tested. However, any configuration of logical elements which provides a correlation between the signals representative of variations in occipital potential and illuminated spots on a visual field target may be employed. The invention having been described, various modifications and departures will now occur to those skilled in this art and the invention described herein should be construed as limited only by the spirit and scope of the appended claims.

What is claimed is:

1. Apparatus for visual testing of a subject comprising: a hemispherical target element; means for supporting said subject's head such that one of said subject's eyes is at the center of said hemisphere; means for providing in a predetermined time sequence an illuminated spot at each of a plurality of positions on the concave surface of said hemisphere, each of said plurality of positions being displaced from the pole point of said hemisphere; sensor means providing as an output signals indicative of variations in occipital potential of said subject; and means for correlating said sensor means output signals with said predetermined time sequence of positioning of said illuminated spot.

2. Apparatus in accordance with claim 1 having a hemispherical output display element coupled to said correlating means, said output display element providing an illuminated spot corresponding to each illuminated spot position on said target element for which said correlated sensor means output signals were less than a predetermined amplitude.

3. Apparatus for visual testing of a subject comprising; a target element; means for providing in a predetermined time sequence an illuminated spot at each of a plurality of positions on said target element, said means providing said illuminated spot at an intensity level sufficient to evoke only a focal retinal response in said subject; a sensor element providing as an output, signals indicative of variations in occipital potential of said subject; and correlating means responsive to said spot illuminating means and said sensor element output signals for correlating said sensor element output signals with said predetermined time sequence of position of said illuminated spots to provide an output indication of correlation between said illuminated spot position and focal retinal stimulation.

4. Apparatus for visual testing of a subject comprising: a target element; a plurality of lamps disposed over the surface of said target element in a predetermined pattern; program means providing first and second output signals, said first output signals being adapted to selectively energize each of said plurality of target lamps in a predetermined time sequence; a sensor element providing as an output signals indicative of variations in occipital potential of said subject; a display element having a plurality of display lamps disposed over its surface having a plurality of display lamps disposed over its surface in the same predetermined pattern as said target lamps are disposed over said target element surface; a plurality of bistable memory means, each of said plurality of bistable memory means being associated with one of said plurality of display lamps, said memory means being adapted when in one of said bistable states to illuminate the associated one of said display lamps and when in the other of said bistable states not to illuminate the associated one of said display lamps; and address means having a signal input, a control input, and a plurality of individual signal outputs, said address means signal input being coupled to said sensor element output, each of said plurality of address means signal outputs being coupled to one of said plurality of memory means, said program means second output signals being connected to said control input of said address means, said address means being adapted in response to said program means second output signals to sequentially address each of said plurality of signal outputs, said address means being adapted to energize said addressed one of said signal outputs only when said sensor element output signal exceeds a predetermined amplitude, the energization of any one of said signal outputs being adapted to change the state of the associated one of said memory elements.

5. Apparatus for visual testing of a subject comprising: a target element, means for providing in a predetermined time sequence an illuminated spot at each of a plurality of positions on said target elements angularly displaced from a fixed axis of focus of said subject; sensor means providing as an output signals indicative of variations in occipital potential of said subject; and correlating means for correlating said sensor element output signals with said predetermined time sequence of positioning of said illuminated spot; said correlating means including upper and lower signal amplitude discriminators, said lower discriminator being adjusted to a first predetermined amplitude corresponding to said sensor output signals indicative of occipital variations evoked in response to focal retinal stimulation, said upper amplitude discriminator being adjusted to a second predetermined amplitude level corresponding to variations in occipital potential resulting from said subject's blinking, said correlating means providing, as a first output, signals indicative of said sensor element signals falling within said first and said second predetermined amplitude limits and as a second output signals having an amplitude in excess of said second predetermined amplitude level.

6. Apparatus for determining the visual field of a subject comprising: a fixation object; means for positioning and fixing said subject's head so that one of said subject's eyes is fixed in a predetermined position with respect to said fixation object; means providing in a predetermined time sequence illumination at each of a plurality of positions angularly displaced from a line between said subject's eye in said predetermined position and said fixation object, said means providing said illumination at an intensity level which can evoke only a focal retinal response in said subject; sensor means providing as an output signals indicative of variations in occipital potential of said subject; and means for correlating said signals indicative of variations of occipital potential with said predetermined time sequence of positioning of said illumination.

7. Apparatus for visual testing of a subject comprising: a target element; a plurality of lamps disposed over the surface of said target element in a predetermined pattern; a sensor element providing output signals indicative of variations in occipital potential of said subject; a display element having a plurality of display lamps disposed over its surface in the same predetermined pattern as said target lamps are disposed over said target surface; program means coupled to said target element, said program means providing a series of pulses, as an output, for selectively energizing each of said plurality of target lamps in a predetermined time sequence; and correlating means coupled to said program means output, to said sensor element output and to said display element, said correlating means selectively energizing only those lamps on said display element corresponding in position to lamps on said target element for which the energizing pulse from said program means is correlated with a sensor element output signal below a predetermined amplitude.

8. Apparatus in accordance with claim 7 wherein said sensor element includes an electroencephalograph and a signal enhancing means adapted to enhance only those signals from said electroencephalograph corresponding to variations of occipital potential evoked in response to focal retinal stimulation.

9. Apparatus for visual testing of a subject comprising: a fixation object; means for positioning said subject's head in a predetermined position with respect to said fixation object; means providing in a predetermined time sequence an illuminated spot at each of a plurality of positions angularly displaced from a line of focus between one eye of said subject in said predetermined position and said fixation object; an electroencephalograph having attachments for said subject's head, said electroencephalograph providing as an output, signals indicative of variations in occipital potential; means for correlating said electroencephalograph output signals with said predetermined time sequence of positioning of said illuminated spots, and means for providing an illuminated spot in a position corresponding to said subject's natural blind spot.

References Cited in the file of this patent
UNITED STATES PATENTS

| | | |
|---|---|---|
| 2,067,103 | Simpkins | Jan. 5, 1937 |
| 2,648,822 | Walter | Aug. 11, 1953 |
| 2,678,692 | Ranseen | May 18, 1954 |
| 2,776,377 | Anger | Jan. 1, 1957 |
| 2,860,627 | Harden | Nov. 18, 1958 |
| 2,933,364 | Campbell | Apr. 19, 1960 |
| 3,000,271 | Harvey | Sept. 19, 1961 |
| 3,087,487 | Clynes | Apr. 30, 1963 |

FOREIGN PATENTS

| | | |
|---|---|---|
| 407,903 | Great Britain | Mar. 29, 1934 |

OTHER REFERENCES

Davis: IRE Transactions on Med. Electronics for July 1958, pp. 29–34.

Sarbacher: Encyclopedic Dictionary of Electronics, published 1959 by Prentice-Hall.